(12) United States Patent
Kirchner et al.

(10) Patent No.: US 10,394,254 B2
(45) Date of Patent: Aug. 27, 2019

(54) MULTI-STAGE FLOW CONTROL ASSEMBLIES

(71) Applicant: SKO FLO Industries, Inc., Woodinville, WA (US)

(72) Inventors: Mark W. Kirchner, Seattle, WA (US); John D. Tomlinson, Seattle, WA (US)

(73) Assignee: SKO FLO Industries, Inc., Woodinville, WA (US)

( * ) Notice: Subject to any disclaimer, the term of this patent is extended or adjusted under 35 U.S.C. 154(b) by 0 days.

(21) Appl. No.: 15/605,673

(22) Filed: May 25, 2017

(65) Prior Publication Data

US 2017/0344030 A1    Nov. 30, 2017

Related U.S. Application Data

(60) Provisional application No. 62/342,120, filed on May 26, 2016.

(51) Int. Cl.
*G05D 7/01* (2006.01)
*G05D 16/10* (2006.01)
*F16K 31/122* (2006.01)

(52) U.S. Cl.
CPC ....... *G05D 7/0126* (2013.01); *F16K 31/1221* (2013.01); *F16K 31/1225* (2013.01); *G05D 7/0133* (2013.01); *G05D 16/10* (2013.01)

(58) Field of Classification Search
CPC ......... Y10T 137/7758; Y10T 137/7768; Y10T 137/7795; F16K 31/1221; F16K 31/1225; G05D 7/0126; G05D 7/0133; G05D 16/10
See application file for complete search history.

(56) References Cited

U.S. PATENT DOCUMENTS

| | | | |
|---|---|---|---|
| 3,456,681 A * | 7/1969 | Faisandier | G05D 16/10 137/489 |
| 9,122,282 B2 * | 9/2015 | Kirchner | G05D 16/06 |
| 2004/0011411 A1 * | 1/2004 | Thordarson | G05D 7/0106 137/613 |
| 2007/0289640 A1 * | 12/2007 | Kirchner | G05D 7/014 137/503 |
| 2009/0071550 A1 * | 3/2009 | Patterson | G05D 16/103 137/523 |
| 2009/0235993 A1 * | 9/2009 | Sugata | G05D 7/0635 137/512 |
| 2012/0085439 A1 * | 4/2012 | Kirchner | G05D 7/0126 137/561 R |

* cited by examiner

Primary Examiner — Jessica Cahill
(74) Attorney, Agent, or Firm — Perkins Coie LLP (57) ABSTRACT

A multistage flow control valve system with a pressure balanced first stage connected to one or more downstream, pressure balanced, intermediate and/or outlet stages configured to accommodate very large pressure drops across the system while maintaining a desired flow rate, and avoiding potentially destructive cavitation within the valves.

25 Claims, 6 Drawing Sheets

MULTI-STAGE FLOW CONTROL ASSEMBLIES

RELATED APPLICATIONS

This application claims priority to and the benefit of U.S. provisional patent application No. 62/342,120 filed May 26, 2016, the disclosure of which is incorporated herein in its entirety by reference thereto.

TECHNICAL FIELD

This invention relates generally to flow control valve assemblies, including constant flow rate controller assemblies, back pressure regulator assemblies, and other flow controllers usable for maintaining a substantially constant flow while allowing large pressure drops across the assemblies.

BACKGROUND

In the production of oil and gas, chemicals such as corrosion inhibitors, scale inhibitors, paraffin inhibitors, hydrate inhibitors, and demulsifiers are typically injected into the wells to maintain efficient flow of oil or gas. These chemicals usually need to be added to the wells production at a constant rate. Often one pump is used to inject the same chemical into several wells with the use of pressure compensated rate control valves at each injection point. The use of these rate controllers reduces set up and operating costs of injection systems because the alternative is to install a separate pump for each injection point and to maintain several pumps instead of one. These injection valves must be pressure compensated because they need to maintain a rate set point with changes of several thousand pounds per square inch across them to accommodate fluctuations in well pressure. A typical chemical injection rate for an oil well is between 0.5 to 200 US gallons per day. Injection pressures range between 500 to 20,000 psi.

A conventional method to achieve rates in this range using pressure compensated rate controllers is to govern the pressure drop across a fixed orifice. The set point for this method is changed by varying the pressure drop across the orifice. This method is described in U.S. Pat. No. 4,893,649. Previous methods to vary the area while maintaining a constant pressure drop have not adequately worked in the low flow range because passages created by mating needles and trims or mating threads to restrict flow are often less than 0.001 inches wide, which makes them prone to clogging and/or filming. The fixed orifice method is robust since hole passage can be made to pass the largest debris for a given flow area and several holes cascading in series can be used to give the same resistance with as much as a twenty fold increase in the flow area reducing the filming and clogging tendencies. The consequences of varying the pressure drop across a fixed resistor is that the range of flow rate set point is limited and passages cannot be opened up to pass blockages as can be done with a mating needle and trim.

Set point range of a valve is defined by its "turn down," which equals the valve's highest flow rate divided by the lowest flow rate achievable. For a fixed valve orifice, the turn down is calculated by taking the square root of the highest pressure drop across the orifice divided by the lowest pressure drop. For example, a valve that offers a pressure drop across the orifice of 200 psi at maximum flow and 2 psi at minimum flow will have a turn down of 10:1. During the life of the well the flow rate range may need to be adjusted, which involves replacing an orifice. Sending personnel or equipment to remote locations to change an orifice represents a substantial expense, particularly if the valve location is under water. U.S. Pat. No. 7,770,595, which is incorporated herein in its entirety by reference thereto, provides a very effective and improved constant flow control valve with a very wide range of flow rate set points independent of pressure changes across the valve.

Pressure compensated flow control valves are designed to maintain constant flow with changes in pressure drop across the device, wherein the flow passes to the underside of a throttling member, such as a mating cone and sharp edged seat (U.S. Pat. No. 6,662,823) and a sharp edged hollow cylinder (U.S. Pat. Nos. 4,250,915 and 5,642,752). In these flow control valves, the flow path is, as an example, under the throttle cone first and then through the mating seat, such that the valves are susceptible to inadequate control or inadvertent closure of the throttle upon a large pressure differential or a pressure spike in the fluid entering the valve. Accordingly, these pressure compensated valves are typically not designed to adequately handle large pressure drops across the valves.

U.S. Pat. Nos. 6,827,100 and 4,210,171 discloses control valves with fluid flow going under the seat first. These control valves, however, are not adequately balanced to handle large pressure drops across the valves or large, sudden pressure spikes (i.e., transient pressure spikes). As a result, the balance of these valves will become unstable with pressure spikes or large pressure drops across the valves.

Pressure balanced rate control valves, such as those disclosed in U.S. Pat. No. 4,893,649, Skoglund U.S. Pat. Nos. 5,234,025, and 6,932,107 are unique from other prior art pressure compensated rate controls because the ratio of the area balanced by the spring chamber is substantially larger than the area of the seat that dissipates the pressure drop. These pressure balanced rate control valves, however, have a configuration and flow direction such that the valves can go into a cyclic opening and closing sequence (sort of an on/off water hammer) with excessive pressure drops across the valve. This cyclic opening and closing can provide an undesirable harmonic cycling that will match the natural frequency of the piping supplying the valve.

A significant problem for conventional flow rate controllers is cavitation. Cavitation will typically occur in a valve trim if the fluid velocities are fast enough to cause the pressure at the velocity point to drop below the vapor pressure of the liquid. When pressure is dropped below vapor pressure it will create a collapsing bubble when the pressure is recovered. In short, such cavitation occurs when the pressure drop across the valve is greater than the valve's outlet pressure (subject to correction for the vapor pressure). The resulting collapsing bubble causes a point pressure load of up to 300,000 psi pressure on valve surfaces. This high contact pressure also causes an instantaneous heating at the collapsing bubble. The high heat and high contact pressure will erode the surfaces and will generate high frequency flow noises reverberating to the piping system. Cavitation and trim selection to avoid cavitation is described in ANSI/ISA-75.01-2002 "Flow Equations for Sizing Control Valves." There is a need for a flow rate controller that effectively eliminates cavitation across its operating conditions.

Back pressure regulators have also been commercially available for decades to help serve as a relief valve or constant spill off device to limit excess pressure to a desired operating pressure range. A multi-stage back pressure regulator, as disclosed in U.S. Pat. No. 9,122,282, which is incorporated herein in its entirety by reference, provides a significant improvement to the back pressure regulator technologies. Conventional back pressure regulators, however, also suffer from cavitation conditions that can occur when there is a large pressure differential (e.g., 1,000 pounds per square inch (psi)) between the inlet and the outlet.

High pressure differential can also cause other problems, such as high frequency flow noises that reverberate throughout a piping system. These noises can be extremely loud and may, in some cases, require installing noise suppression systems to meet safety standards. Another problem with conventional back pressure regulators is that they can include internal components that work against one another. For example, U.S. Pat. No. 8,375,983 discloses a two stage device with the second stage governing the pressure drop across the first stage. The second stage balances two different pressures inside the regulator against the pressure outside of the regulator over a bound area to create a force that governs the pressure differential across the first stage. A spring governs the pressure drop across the stage upstream of it. Flow passes through the second stage by going around a throttling pin then through the throttling seat. In this arrangement, a spike in inlet pressure will cause the second stage piston to drive towards the seat causing unstable pressure regulation. When two or more of these devices are installed in parallel, they can fight each other without external pressure spikes causing this effect.

There is a need for flow control valve assemblies and pressure regulator assemblies that can operate under very high pressure differentials without causing cavitation and excessive reverberation.

SUMMARY

A multi stage flow control assembly is provided that overcomes drawbacks experienced in the prior art, that solves other problems, and that provides other benefits. One embodiment of the present technology provides a multistage flow control assembly comprising a first stage and a second stage, and being configured to accommodate large pressure drops across a system while maintaining a desired flow rate. The first stage of the flow control assembly can comprise a first body, a bore, a biased first piston, a first fluid control portion, and a pilot passageway. The first body can have a first inlet port, a first outlet port, and a first fluid passageway therebetween containing fluid at a first fluid pressure, a second fluid pressure, and a third fluid pressure, the second fluid pressure being less than the first fluid pressure, and the third fluid pressure being less than the second fluid pressure. The bore can have lower and upper portions, the lower portion being in fluid communication with the first inlet port and in fluid communication with the upper portion via an orifice flow path. The biased first piston can be slidably positioned within the bore and coupled to the first fluid passageway. The first fluid control portion can be configured to receive fluid at the second fluid pressure and direct fluid toward the first outlet port at the third fluid pressure, the first fluid control portion being automatically adjusted in response to the second and/or third fluid pressures. The pilot passageway can be in fluid communication with the upper portion of the bore and configured to receive fluid at the second fluid pressure.

The second stage of the flow control assembly can comprise a second body, a receptacle, a biased second piston, a second fluid control portion. The second body can be coupled to the first body of the first stage and have a second inlet port in fluid communication with the first outlet port, a second outlet port, and a second fluid passageway between the second inlet and outlet ports, the second fluid passageway containing the fluid at the second and third fluid pressures and a fourth fluid pressure less than the third fluid pressure. The receptacle can be attached to and in fluid communication with the pilot passageway, wherein the receptacle is configured to receive a portion of fluid at the second fluid pressure. The second piston can be in the second body and have a proximal end portion and a distal end portion opposite the proximal end portion, wherein the distal end portion is in fluid communication with the portion of the fluid at the second fluid pressure, and the proximal end portion is in fluid communication with the fluid at the third fluid pressure, and wherein the second piston is axially moveable in the second body in response to the second and/or third fluid pressures. The second fluid control portion can be configured to receive fluid at the third fluid pressure and direct fluid toward the second outlet port at the fourth fluid pressure, wherein the second fluid control portion is automatically adjusted to control flow therethrough in response to the second, third and/or fourth fluid pressures.

In other embodiments, the present technology provides a constant-flow multistage valve assembly that comprises a first fluid passageway configured to carry fluid at a first fluid pressure, a second fluid passageway configured to carry fluid at a second fluid pressure less than the first fluid pressure, a third fluid passageway configured to carry fluid at a third fluid pressure less than the second fluid pressure, and a fourth fluid passageway configured to carry fluid at a fourth fluid pressure less than the third fluid pressure. The valve assembly can further comprise a flow orifice, a bore, a biased first piston, a first fluid control portion, a pilot passageway, a channel, a receptacle, a biased second piston, and a second fluid control portion. The flow orifice can be in fluid communication with the first fluid passageway and configured to direct fluid from the first fluid passageway at the first fluid pressure to the second fluid passageway at the second fluid pressure. The bore can have lower and upper portions in fluid communication with one another via the flow orifice, the lower portion being in fluid communication with the first fluid passageway at the first fluid pressure, and the upper portion being in fluid communication with the second fluid passageway at the second fluid pressure. The biased first piston can be slidably positioned within the bore and coupled to the first fluid passageway at the first fluid pressure and/or the second fluid passageway at the second fluid pressure. The first fluid control portion can be configured to direct fluid from the second fluid passageway at the second fluid pressure through the first fluid control portion to the third fluid passageway at the third fluid pressure, the first fluid control portion being automatically adjusted in response to the second and/or third fluid pressures.

The pilot passageway can be in fluid communication with the upper portion of the bore and the second fluid passageway. The channel can be fluidly coupled to the third fluid passageway and configured to receive fluid from the first fluid control portion at the third fluid pressure. The receptacle can be in fluid communication with the pilot passageway, wherein the receptacle is configured to receive a portion of fluid at the second fluid pressure. The biased second piston can be fluidly coupled to the fourth fluid passageway, the second piston having a proximal end portion and a distal end portion opposite the proximal end portion, wherein the distal end portion is in fluid communication with the portion of the fluid at the second fluid pressure, and the proximal end portion is in fluid communication with the third fluid passageway at the third fluid pressure, and wherein the second piston is axially moveable in response to the second and/or third fluid pressures. The second fluid control portion can be configured to receive fluid from the third fluid passageway at the third fluid pressure and direct fluid through the second fluid control portion to the fourth fluid passageway at the fourth fluid pressure, the second fluid control portion being automatically adjusted to control flow therethrough in response to the second, third and/or fourth fluid pressures.

In other embodiments, the present technology provides a pressure-independent flow rate controller having a first stage and second stage. The first stage can comprise a first body, an interior chamber, an intermediate passageway, a first piston, a throttling assembly, a restriction assembly, and a pilot passageway. The first body can have a first inlet port, a first outlet port, and a first fluid passageway therebetween containing fluid at a first fluid pressure, a second fluid pressure, and a third fluid pressure, the second fluid pressure being less than the first fluid pressure, and the third fluid pressure being less than the second fluid pressure. The interior chamber can include first and second chamber portions, and a balance channel adjacent to the second chamber portion, the balance channel being in fluid communication with the first inlet port at the first fluid pressure. The intermediate passageway can be at the second fluid pressure and in fluid communication with the first chamber portion. The first piston can be slidably disposed in the interior chamber and coupled to the first fluid passageway. The throttling assembly can be positioned between the first inlet port and first piston, the throttling assembly being configured to receive fluid at the first fluid pressure and direct fluid through the throttling assembly to the first chamber portion at the second fluid pressure, the throttling assembly being automatically adjusted in response to the first and/or second fluid pressures. The restriction assembly can be between the intermediate passageway containing fluid at the second fluid pressure and the first outlet port at the third fluid pressure, the restriction assembly being adjustable between closed and open positions, wherein the open position allows the fluid in the intermediate passageway to flow toward the first outlet port. The pilot passageway can be in fluid communication with the first inlet port and configured to receive fluid at the first fluid pressure.

The second stage is be in fluid communication with the first stage and comprise a second body, a receptacle, a biased second piston, a valve seat member. The second body can be coupled to the first body of the first stage and have a second inlet port in fluid communication with the first outlet port, a second outlet port, and a second fluid passageway between the second inlet and outlet ports, the second fluid passageway containing the fluid at the first and third fluid pressures and a fourth fluid pressure less than the third fluid pressure. The receptacle can be attached to and in fluid communication with the pilot passageway, wherein the receptacle is configured to receive a portion of the fluid at the first fluid pressure. The biased second piston can be in the second body and have a proximal end portion and a distal end portion opposite the proximal end portion, wherein the distal end portion is in fluid communication with the portion of the fluid at the first fluid pressure, and the proximal end portion is in fluid communication with the fluid at the third fluid pressure, and wherein the second piston is axially moveable in the second body in response to the first and/or third fluid pressures. The valve seat member can be configured to receive a valve portion at the proximal end portion, wherein the fluid flows between the valve seat member and valve portion and undergoes a pressure drop from the third fluid pressure to the fourth fluid pressure, and wherein positioning of the valve portion relative to the valve seat member is automatically adjusted in response to the first, third and/or fourth fluid pressures.

In other embodiments, the present technology provides a multistage valve assembly that comprises a first fluid passageway configured to carry fluid at a first fluid pressure, a second fluid passageway configured to carry fluid at a second fluid pressure less than the first fluid pressure, a third fluid passageway configured to carry fluid at a third fluid pressure less than the second fluid pressure, and a fourth fluid passageway configured to carry fluid at a fourth fluid pressure less than the third fluid pressure. The valve assembly can further comprise a flow orifice, a first fluid control portion, a pilot passageway, a channel, a biased piston, a second fluid control portion, a receptacle. The flow orifice can be in fluid communication with the first fluid passageway and configured to direct fluid from the first fluid passageway at the first fluid pressure to the second fluid passageway at the second fluid pressure. The first fluid control portion can be configured to direct fluid from the second fluid passageway at the second fluid pressure through the first fluid control portion to the third fluid passageway at the third fluid pressure, the first fluid control portion being adjusted in response to the second and/or third fluid pressures. The pilot passageway can be in fluid communication with the second fluid passageway. The channel can be fluidly coupled to the third fluid passageway and configured to receive fluid from the first fluid control portion at the third fluid pressure. The biased piston can be fluidly coupled to the fourth fluid passageway, the second piston having a proximal end portion and a distal end portion opposite the proximal end portion, wherein the distal end portion is in fluid communication with the portion of the fluid at the second fluid pressure, and the proximal end portion is in fluid communication with the third fluid passageway at the third fluid pressure, and wherein the piston is axially moveable in response to the second and/or third fluid pressures. The second fluid control portion can be configured to receive fluid from the third fluid passageway at the third fluid pressure and direct fluid through the second fluid control portion to the fourth fluid passageway at the fourth fluid pressure, the second fluid control portion being automatically adjusted to control flow therethrough in response to the second, third and/or fourth fluid pressures. The receptacle can be in fluid communication with the pilot passageway, wherein the receptacle is configured to receive a portion of fluid at the second fluid pressure that acts against the distal end of the piston.

In another embodiment, the present technology provides a flow control multistage valve assembly, comprising a first fluid passageway configured to carry fluid at a first fluid pressure, a second fluid passageway configured to carry fluid at a second fluid pressure less than the first fluid pressure, and a third fluid passageway configured to carry fluid at a third fluid pressure less than the second fluid pressure. An adjustable valve is intermediate the first and second fluid passageways and configured to direct fluid from the first fluid passageway at the first fluid pressure to the second fluid passageway at the second fluid pressure. A pilot passageway in fluid communication with the first fluid passageway and configured to carry fluid at the first fluid pressure. A biased piston is fluidly coupled to the second and third fluid passageways. The piston has a proximal end portion and a distal end portion opposite the proximal end portion, wherein the distal end portion is in fluid communication with the portion of the fluid at the first fluid pressure. The proximal end portion is in fluid communication with the second fluid passageway at the second fluid pressure, and wherein the piston is axially moveable in response to the first and/or second fluid pressures. A fluid control portion is configured to receive fluid from the second fluid passageway at the second fluid pressure and direct fluid through the second fluid control portion to the fourth fluid passageway at the fourth fluid pressure. The fluid control portion can be automatically adjusted to control flow therethrough in response to the second and/or third fluid pressures. A receptacle is in fluid communication with the pilot passageway, wherein the receptacle is configured to receive a portion of fluid at the first fluid pressure that acts against the distal end of the piston.

DETAILED DESCRIPTION

The present disclosure describes one or more a flow controller assemblies in accordance with certain embodiments of the present technology. Several specific details of the invention are set forth in the following description and the Figures to provide a thorough understanding of certain embodiments of the invention. One skilled in the art, however, will understand that the present invention may have additional embodiments, and that other embodiments of the invention may be practiced without several of the specific features described below.

Figure 1:
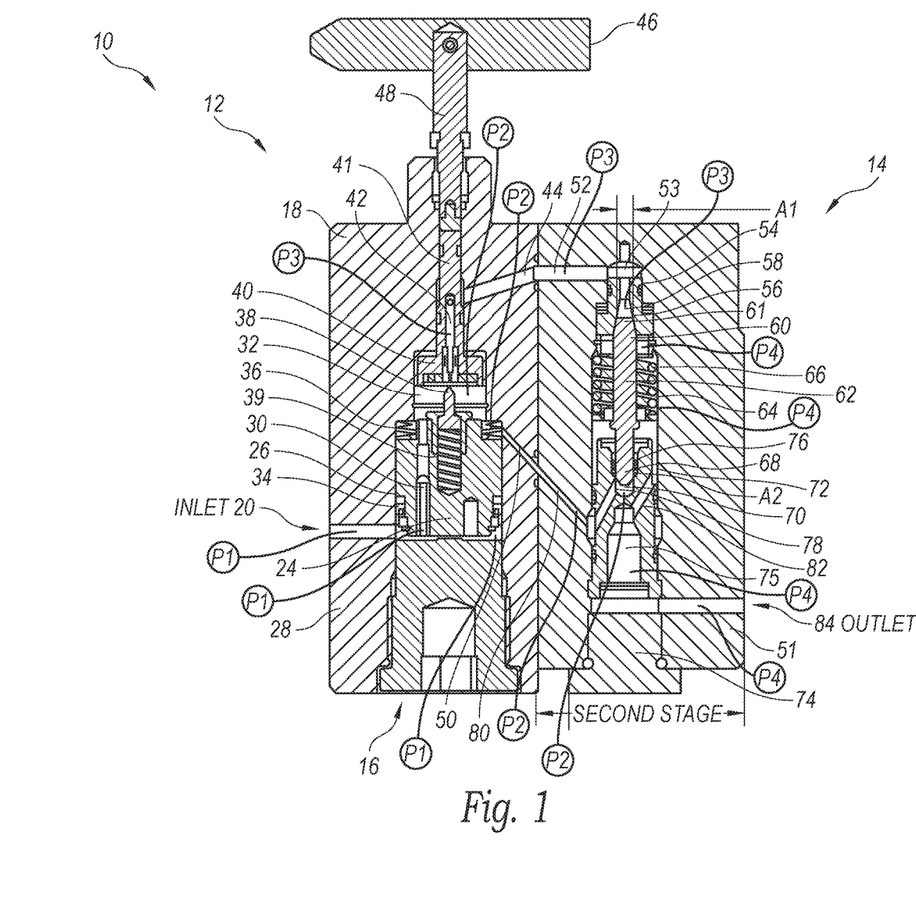
FIG. 1 is a schematic cross-sectional view of a two-stage flow control assembly in accordance with at least one embodiment of the present technology, wherein a constant flow rate valve (i.e., first stage) is coupled to an outlet stage (i.e., second stage).

FIG. 1 is a schematic cross-sectional view of a flow control assembly 10 in accordance with at least one embodiment of the present technology, wherein a flow control first stage 12 is connected to an outlet stage 14 that receives a flow of fluid under pressure from the first stage 12. In the illustrated embodiment, the flow control first stage 12 is a constant flow rate valve that has a valve body 18 with an inlet port 20 that receives a fluid flow at a fluid pressure P1. The flow control first stage 12 of the illustrated embodiment is similar to the constant flow rate valve disclosed in U.S. Pat. No. 4,893,649, which is incorporated herein in its entirety by reference thereto, except for the differences discussed below. A primary piston 24 is sealably and slidably positioned within a bore 26 in the valve body 18. A lower portion 28 of the bore 26 is in communication with the inlet port 20 and receives the fluid at P1. The primary piston 24 has a fixed orifice flow path 30 therethrough that communicates with an upper portion 32 of the bore 26. In other embodiments, the flow path 30 need not pass through the primary piston 24, but may instead fluidly interconnect the upper and lower portions 32 and 28, respectively, of the bore 26 by passing through the valve body 18. A seal 34 is connected to a lower portion of the primary piston 24 and engages the valve body 18 to prevent fluid from flowing around the periphery of the piston 24.

One or more springs 36 or other biasing members engage an upper portion of the primary piston 24 and urge the piston toward the lower portion 28 of the bore 26. The springs 36 may be selected to provide a spring rate to achieve a desired fluid flow rate through the valve 16. A spring-biased pin valve 38 is coupled to the upper portion of the piston 24 and is in communication with the upper portion 32 of the bore 26. The pin valve 38 is connected to the springs 36 attached to the piston 24. The pin valve 38 axially moves relative to a pin valve seat 40 on an axially adjustable shaft member 41 coaxially aligned with the pin valve 38. Although the illustrated embodiment uses a pin valve 38 and pin valve seat 40, other embodiments can use other types and/or shapes of valve plugs, such as a ball-type valve plug or the like. The surface area of the valve plug, however, is substantially less than the surface area of the piston, so that the valve assembly 10 can function independently from the flow pressure at the outlet port, as described below.

The shaft member 41 has a fluid exit channel 42 defined in part by the valve seat 40 and coaxially aligned with the pin valve 38. The fluid exit channel 42 receives a flow of fluid that moves from the upper portion 32 of the bore 26 and between the pin valve 38 and the valve seat 40. The fluid exit channel 42 is connected to an outlet port 44 formed in the valve body 18. The fluid flow rate to the outlet port 44 may be varied by adjusting a control handle 46 and associated screw shaft 48, which axially moves the shaft member 41 and the valve seat 40 to vary the position of the pin valve seat 40 relative to the pin valve 38.

As the fluid passes though inlet port 20 and enters the lower portion 28 of the bore, the fluid is at the high pressure P1. The spring-biased piston 24 is pushed toward bore's upper portion 32 by the fluid at pressure P1. Fluid passing through the fixed orifice flow path 30 enters the bore's upper portion 32 and is at a second pressure P2, which is less than P1. As seen in FIG. 1, a pilot passageway 50 is provided in the body 18 and is connected to the bore's upper portion 32. The pilot passageway 50 receives a portion of the fluid flow at pressure P2. When the combination of the fluid flow's pressure in the bore's upper portion 32 and the spring force of spring 36 exceeds the pressure P1 in the bore's lower portion 28, the piston 24 is pushed axially toward the bore's lower portion 28, and the pin valve 38 moves away from the pin valve seat 40. The fluid passing through the valve seat 40 into the exit channel 42 and to the outlet port 44 is at pressure P3, which is less than pressure P2. A piston equilibrium position is attained when the flow pressure in the bore's lower portion 28 equals the flow pressure in the bore's upper portion 32 plus the spring force of the spring 36. If the pressure drop across the constant flow rate valve 16 between the inlet and outlet ports 20 and 44 is too high, such that the pressure drop is greater than the outlet pressure P3, and/or the constant flow rate to too high, the valve could experience potentially destructive cavitation.

The valve assembly 10 can avoid cavitation and accurately control the fluid flow by controlling the overall pressure drops across stages of the valve assembly 10. As seen in FIG. 1, the valve assembly 10 is a two stage assembly with the outlet stage 14 connected to the first stage 12. The outlet stage 14 has a valve body 51 securely fastened or otherwise attached to the body 18 of the first stage 12. The outlet stage's valve body 51 has an inlet port 52 sealably connected to the outlet port 44 of the first stage and configured to receive the fluid into an upper fluid chamber 53 at pressure P3. The valve body 51 contains a valve seat member 54 with a central passageway 56 in communication with the upper fluid chamber 53 and the inlet port 52. The valve seat member 54 has a tapered seat 58 configured to receive a tapered valve pin portion 60 on a proximal end portion 61 of a spring-biased, unitary valve piston 62 positioned within an intermediate fluid chamber 64 within the valve body 51. Accordingly, the fluid from the upper fluid chamber 53 flows through the valve seat 58 and over the valve pin portion 60 of the piston 62 in an under-then-over-flow configuration.

The piston 62 is coaxially aligned with the tapered seat 58 and the central passageway 56. The intermediate fluid chamber 64 contains a spring 66 or other suitable biasing member that engages the piston 62 and urges the piston 62 axially away from the valve seat member 54, such that the valve pin portion 60 is biased away from the tapered seat 58 in an open position. In the illustrated embodiment, the spring 66 is concentrically positioned about the piston 62. The spring 66 acting on the piston 62 is configured to resist movement of the piston 62, which results in limiting the pressure drop across P1 and P2 in the first stage to a maximum drop. The piston 62 and integrally connected valve pin portion 60 are configured to self-arrest fluid shock because pressure shocks will open the flow rate opening between the pin and the seat, rather than driving it shut, and the cup seal will dampen oscillation via drag.

A distal end portion 68 of the piston 62 is slidably received in a receptacle 70 formed in the upper end 72 of a plug 74 fixedly sealed to the valve body 51 to close a bottom portion 75 of the fluid chamber 64. The plug 74 is configured to allow for simple and efficient assembly of the outlet stage 14. In the illustrated embodiment, a cup seal 76 or other suitable seal is provided between the distal end portion 68 of the piston 62 and the sidewalls of the receptacle 70, so as to allow the piston 62 to move axially within the intermediate fluid chamber 64 while blocking fluid from moving past the distal end portion 68 and into the receptacle 70. In an alternate embodiment, metal bellows can be used instead of the cup seal configuration for use of the assembly in high pressure and high temperature conditions, because the small size of the bellows diameter allows for a high pressure bellows construction.

The bottom of the receptacle 70 is fluidly connected to a second pilot passageway 80 having one portion extending through the plug 74 and another portion extending through the valve body 51. The pilot passageway 80 of the outlet stage 14 is sealably connected to the first pilot passageway 50 of the first stage 12. Accordingly, a portion of the fluid at pressure P2 is provided to the second pilot passageway 80 and the bottom of the receptacle 70 below the piston 62. Accordingly, the fluid at pressure P2 engages and acts against the end of the piston's distal end portion 68. In the illustrated embodiment, the outlet stage 14 is configured with a pressure balanced fluid throttling arrangement. The portion of the valve pin 60 against which the fluid at pressure P3 acts has an area A1, which is substantially the same as the area A2 of the piston's distal end 68 against which the fluid at pressure P2 acts. This arrangement provides a second pressure balance throttling point in the outlet stage 14 downstream of the pressure balance throttling point in the first stage 12 with the second pressure balance throttling point being activated when pressure drop across the first pressure balance throttling point exceeds a selected set level, such as a factory set level.

The intermediate fluid chamber 64 is connected to the chamber's bottom portion 75 by a lower channel 82, and the bottom portion 75 is connected to an outlet port 84. The fluid flows from the outlet port 84 substantially at pressure P4 and at a constant rate while allowing for a large overall pressure drop between inlet port 20 and outlet port 84. In operation, the fluid from the first stage's outlet port 44 at pressure P3 enters the outlet stage's inlet port 52. In addition, the fluid from the first pilot passageway 50 enters the second pilot passageway 80 and the bottom chamber 78 at the pressure P2. When the pressure P3 is greater than the combination of the pressure P2 and the spring force of the spring 66 acting on the piston 62, the tapered valve pin 60 is moved away from the tapered valve seat 58 to allow the fluid to flow into the intermediate fluid chamber 64 with a pressure drop to pressure P4, which is less than pressure P3. The fluid at pressure P4 then flows through the intermediate chamber 64, the lower channel 82, and out the outlet port 84. When the pressure drop across the valve is insufficient, such as when pressure P3 plus the spring force of spring 66 is not greater than pressure P2, the valve remains open without throttling the fluid flow, and the outlet stage is not activated and fluid flows to the outlet port 84 at the selected constant flow rate. Accordingly, the outlet stage 14 is only activated when needed to maintain the constant flow rate.

The use of the second pressure balanced throttle point in the outlet stage 14 with the flow entering under the valve seat 58 first allows for stable throttling for the outlet stage 14 that will not create a pressure spike between the stages. This avoids instability between the two stages. The fluid path under the valve seat 58 first and then over the valve pin 60 will suppress a pressure spike from traveling through the valve because any pressure spike drives the piston 62 and valve pin 60 away from the valve seat 58 dissipating the pressure drop spike across the valve seat and piston. In the illustrated embodiment, the tapered tip portion of the valve pin 60 positioned with the flow first entering under the valve seat 58 is such that the effective area of the valve seat 58 slightly increases as the seat comes closer to contacting the tip portion, which in turn helps stabilize the throttling action to reduce pressure spikes caused by a second stage throttling. As a result, the outlet stage 14 coupled with the first constant flow rate valve (i.e., the first stage 12) allows the flow control assembly 10 to handle up to a very large pressure differential across the assembly while maintaining a flat or constant flow rate through the flow control assembly 10. The multiple sequential pressure drops across the portions of the stages to avoid an excessive single pressure drop within the assembly, thereby avoiding a pressure drop that exceeds the outlet pressure so as to avoid potentially destructive cavitation. The first stage 12 and the outlet stage 14 can be precisely tuned during manufacturing for large overall pressure drops in the range of approximately 500-5000 psi by selecting piston areas and the biasing springs within the stages. The pressure drop across each stage, however, is only in the range of approximately 500-3000 psi.

The flow control assembly 10 with the outlet stage 14 provides a very compact assembly that maintains constant fluid flow with a flat delivery while avoiding cavitation due to large individual pressure drops within the assembly. More than two stages can be provided in series that result in a stable assembly with respect to oscillations and can be used to reduce drop across the rate control pin and seat. The multistage assembly 10 also reduces the individual pressure drop across the pressure compensated rate control and successive stages, which allows the assembly 10 to maintain a more constant flow versus pressure drop.

Figure 2:
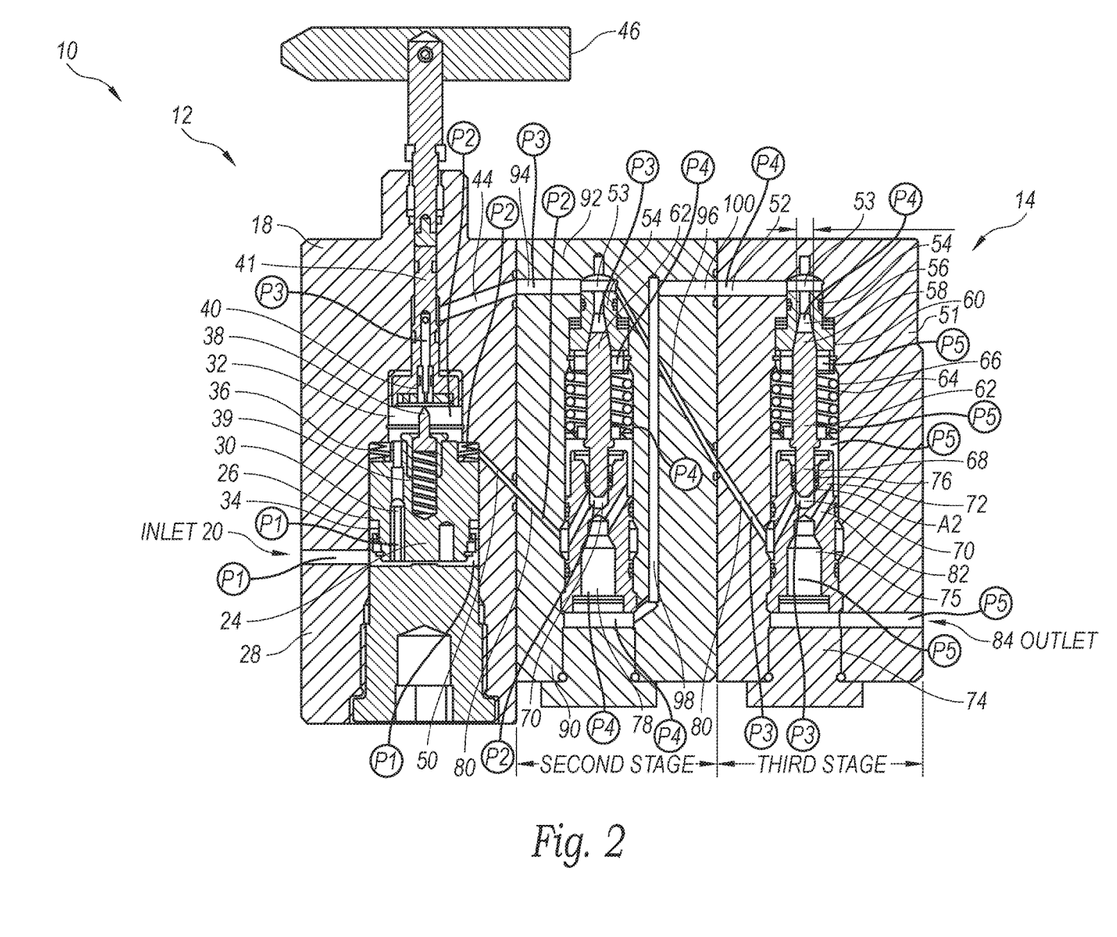
FIG. 2 is a schematic cross-sectional view of the flow control assembly of FIG. 1 in a three-stage arrangement with an intermediate stage (i.e., second stage) connected to the outlet stage (i.e., third stage).

FIG. 2 is a schematic cross-sectional view of the constant rate flow control assembly 10 with three valve stages interconnected in series, wherein an intermediate stage 90 is connected to each of the first stage 12 and the outlet stage 14 discussed above. The intermediate stage 90 (i.e., the second stage of the illustrated embodiment) has a valve body 92 securely connected on one side to the first stage 12, and connected on the opposite side to the outlet stage 14 (i.e., the third stage). The intermediate stage 90 has a construction substantially similar to the outlet stage 14 except as discussed below. The intermediate stage has a valve body 92 with inlet port 94 sealably connected to the outlet port 44 of the first stage 12 and configured to receive the fluid into the upper fluid chamber 53 at pressure P3. The valve body 92 contains the valve seat member 54, the spring-biased, unitary valve piston 62 with the tapered valve pin portion 60, the spring 66, the receptacle 70, the plug 74, etc., as discussed above. The pilot passageway 80 in the valve body 92 sealably connects to the pilot passageway 50 of the first stage 12 so as to receive the fluid at pressure P2. The valve body 92 also has a second pilot passageway 96 connected to the upper fluid chamber portion 53, such that the second pilot passageway 96 contains the fluid at pressure P3.

The intermediate stage 90 has an outlet passageway 98 in the valve body 92 connected to the bottom chamber 78 and to an outlet port 100. The fluid at the outlet port 100 is at pressure P4, which is less than P3. The outlet port 100 is sealably connected to the inlet port 52 of the outlet stage 14. As fluid passes through the valve seat 58 and passed the valve pin 60 in the under-then-over flow arrangement, the fluid enters the intermediate fluid chamber 64 at pressure P5, which is less than pressure P4. The pilot passageway 80 of the outlet stage 14 is sealably connected to the pilot passageway 96 of the intermediate stage 90 such that the fluid in the pilot passageway 96 and the receptacle 70 under the piston's distal end portion 68 is at pressure P3. The valve assembly with the first, second, and third stages in serial arrangement can be tuned for large overall pressure drops in a system by selecting the biasing springs within the stages, which controls the ranges within which each stages operates for control of the flow through the valve assembly 10 to maintaining a constant flow rate through the flow control assembly 10 that, while avoiding an excessive single pressure drop within the assembly, thereby avoiding potentially destructive cavitation.

Figure 3:
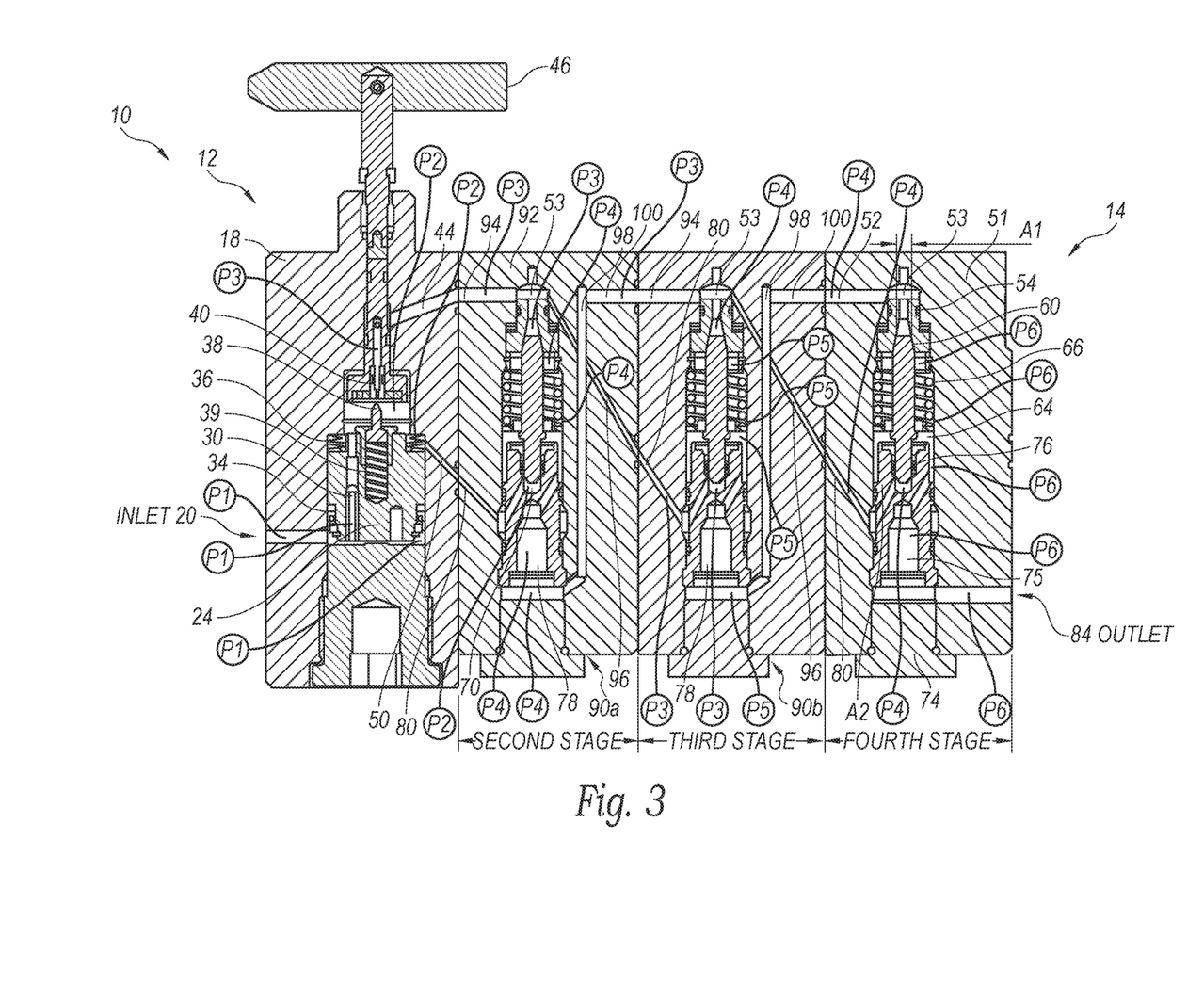
FIG. 3 is a schematic cross-sectional view of the flow control assembly of FIG. 2 in a four stage arrangement with two intermediate stages (i.e., second and third stages connected to the outlet stage (i.e., fourth stage).

FIG. 3 is a schematic cross-sectional view of the flow control assembly 10 in a four stage arrangement with two intermediate stages 90a and 90b (i.e., second and third stages) connected between the first stage 12 and the outlet stage 14 (i.e., the fourth stage). Each of the intermediate stages 90a and 90b are substantially identical to the intermediate stage 90 discussed above. The inlet port 94 of the second stage 90a is sealably connected to the outlet port 44 of the first stage 12 and receives the fluid at pressure P3. The pilot passageway 80 of the second stage 90a and the receptacle 70 below the piston 62 are connected to the pilot passageway 50 of the first stage 12 and receive the fluid at pressure P2. The outlet port 100 of the second stage 90a is connected to the inlet port 94 of the third stage 90b, which receives the fluid at pressure P4. The pilot passageway 80 of the third stage 90b and the associated receptacle 70 below the piston 62 are connected to the pilot passageway 96 of the second stage 90a and receive the fluid at pressure P3.

The outlet port 100 of the third stage 90b is sealably connected to the inlet port 52 of the outlet stage 14 and receives the fluid at pressure P5, and the pilot passageway 96 of the third stage 90b is connected to the pilot passageway 80 of the outlet stage 14 and receives the fluid at pressure P4. And, the fluid in the intermediate fluid chamber 64, the bottom chamber 78, and the outlet port 84 of the outlet stage 14 contain the fluid at pressure P6, which is less than P5. The intermediate stages 90a and 90b and the outlet stage 14 can be tuned by providing the selected biasing springs and fluid engagement areas of the pistons 62 to control the pressure drops across each of the sequential stages to provide the operational performance with a wide range of flow rates (i.e., in the range of up to approximately 2 gallons/min (gpm), with a turndown of approximately 50:1) with up to a very large overall pressure drop (i.e., in the range of approximately 500-20,0000 psi) across the entire assembly 10 between inlet port 20 of the first stage 12 and the outlet port 84 of the outlet stage, and a pressure drop across each stage in the range of approximately 500-3000 psi.

As an example, the multi-stage assembly 10 illustrated in FIG. 3 can be configured to handle a 15,000 psi overall pressure drop, wherein the inlet pressure P1 is 16,000 psi and the outlet pressure P6 is 1000 psi. The first stage 12 is configured for a 4000 psi pressure drop, so the outlet pressure P3 is 12,000 psi. The intermediate stages 90a and 90b, and the outlet stages 14 are configured so the outlet pressure P4 is 7,000 psi (i.e., a 5,000 psi pressure drop across the first intermediate stage 90a), and the outlet pressure P5 is 3,000 psi (i.e., a 4,000 psi pressure drop across the second intermediate stage 90b). This results in a 2000 psi pressure drop across the outlet stage 14 Accordingly, the outlet pressure of each stage is greater than the pressure drop across the respective stage, thereby providing a constant flow rate over a 15,000 psi total pressure drop, all while avoiding cavitation within the multiple stages. If the inlet fluid pressure P1 significantly decreases such that subsequent flow throttling is not needed in one or more subsequent stages, then such subsequent stages will remain open and inactive to allow the fluid flow to continue to pass therethrough at the selected constant flow rate.

The third, fourth, and fifth pressure balanced throttling points in the sequential downstream stages can be added because pressure drops between stages self-arrest pressure drop spikes. One of the benefits of the assembly is that only the first stage uses the cup seal 34, which minimizes drag and does not create additional fluid cavities fed by pilot passages. Feeding passages through pilot lines can cause delays in piston movement, which in turn can cause under and over shoot of required throttling action, which in turn can cause instability. The ability to add more stages allows a valve to take higher pressure drops and not erode or cavitate. More stages also allows the valve to control flow rate of fluids comprised of long chain polymers that will break down and may become ineffective if subjected to severe shearing caused by high pressure drops over singular throttling points. Sharing the pressure drops over several throttling points reduces the shearing action compared to dissipating the drop over one point. In addition, the one piece piston finds alignment to the mating seat by tilting with the pivot being the cup seal. A tilting of the one piece piston substantially avoids pressure flutter between the stages. The alignment of the one piece piston to the seat is enhanced by the low included angle of the end of the piston taper mating with the seat.

Although FIG. 2 shows a multi-stage constant rate flow valve assembly with three stages in series, and FIG. 3 shows the assembly with the four stages in series, other embodiments can include multiple stages in series with the first stage and the outlet stage as needed for desired performance and operational requirements of the assembling in the selected operational environment.

Figure 4:
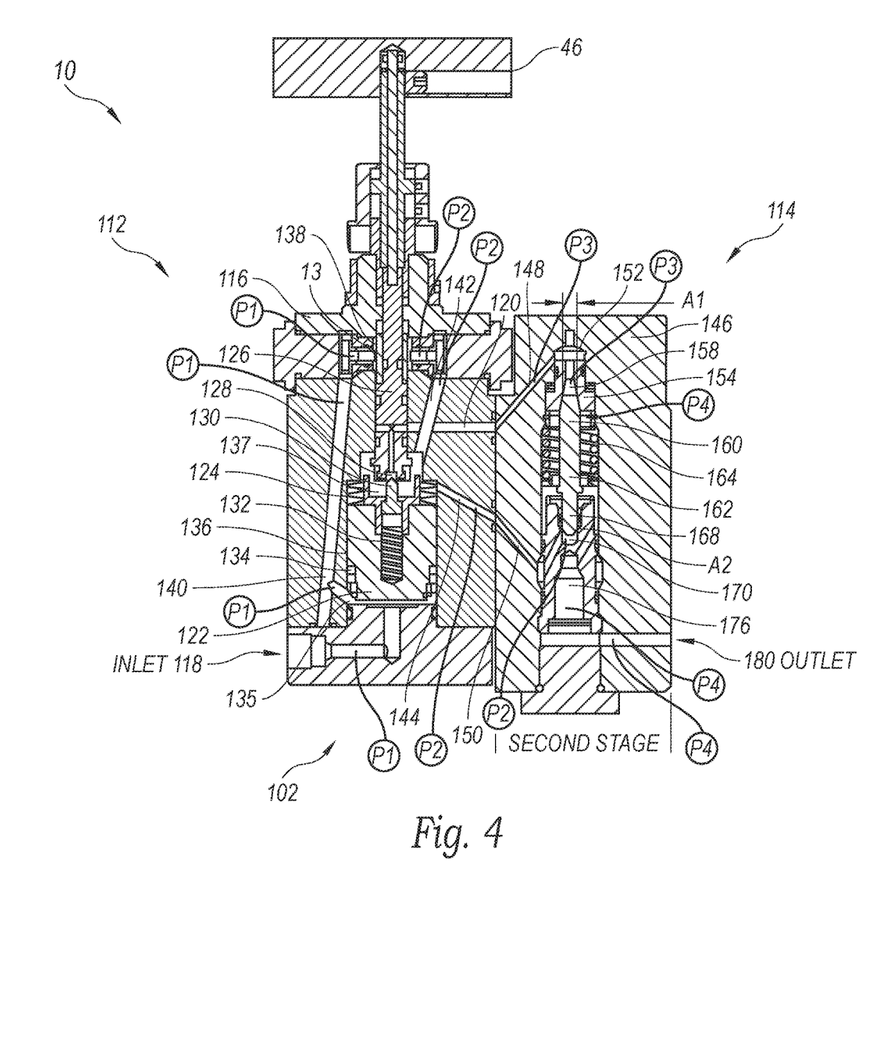
FIG. 4 is a schematic cross-sectional view of a flow control assembly in accordance with another embodiment of the present technology, wherein the first stage configured as a constant flow rate valve is coupled to an outlet stage.

The multi-stage valve assembly can also be configured with a constant rate valve similar to the constant flow rate valve disclosed in U.S. Pat. No. 7,770,595, which is incorporated herein in its entirety by reference thereto. FIG. 4 is a schematic cross-sectional view of a multi-stage flow control assembly 110 in accordance with another embodiment of the present technology, wherein a first stage 112 is configured as a constant flow rate valve for providing a substantially constant flow of fluid through the valve. The first stage 112 is connected to an outlet stage 114 with a construction similar to the outlet stage 14 discussed above. The first stage 112 is a valve assembly with a valve body 116 with a flow inlet port 118 and a flow outlet port 120.

The valve body 102 contains a series of concentric bores that contain a piston 122, a piston biasing member 124, such as a spring, and a central shaft 126. A valve seat 128 is connected to the lower end of the shaft 126, and the valve seat 128 has an inside diameter that mates with a tapered or cone-shaped end of a valve pin 130 supported by the piston 122. A pin spring 132 between the pin 130 and the piston 122 provides a force to keep the pin in position and centered relative to the valve seat 128. The pin spring 132 also prevents the pin 130 from "crashing" against the seat 128. The axial movement of the piston 122 and the pin 130 relative to the seat 128 is configured to maintain a constant fluid flow rate through the valve assembly 110 despite changes in the pressure drop across the first and outlet stages 112 and 114 of the valve assembly 110.

A seal, such as a cup seal 134, is attached to the piston 122 and sealably engages the piston bore 136. The cup seal 134 separates fluid within the valve assembly's flow path, so inlet pressure P1 is on one side of the cup seal 134 (e.g., below the cup seal), and fluid at an intermediate pressure P2 is on the other side of the cup seal 134 (e.g., above the cup seal). The arrangement of the spring-biased piston 122 and the pin 130 mating with the seat 128 is configured to maintain a substantially constant pressure drop across a variable restrictor assembly 138.

The lower portion 135 of the piston bore 136 below the cup seal 134 is connected to a flow passageway 140 formed by a hole or other passageway formed in the body 116. The flow passageway 140 carries the fluid at pressure P1 from the inlet 118 to the variable restrictor assembly 138. The fluid passes through the variable restrictor assembly 138 and exits at pressure P2, which is less than the fluid pressure P1. The fluid flows into a second flow passageway 142, which carries the fluid to the pin 130 and the seat 128 at the bottom portion of the shaft 126. The fluid at pressure P2 flows through the second flow passageway 142 into the upper portion 137 of the piston bore 136 that contains the piston biasing member 124 and pin 130. The fluid at pressure P2 is also in a pilot passageway 144 that is connected to the upper portion of the piston bore 136 and that extends through the body 116. The fluid also flows from the upper portion 137 of the piston bore 136 through a restriction between the pin 130 and the seat 128 in an over-then-under arrangement, which creates another drop in fluid pressure from P2 to P3. The fluid downstream of the mating pin 130 and seat 128 and at the outlet port 120 is at pressure P3.

The outlet stage 114, which is a second stage in the embodiment of FIG. 4, has a body 146 with an inlet port 148 sealably connected to the outlet port 120 of the first stage 112 so as to receive a portion of the fluid at pressure P3. The outlet stage 114 also has a pilot passageway 150 sealably connected to the pilot passage 144 of the first stage 112 so as to receive a portion of the fluid from the upper portion 137 of the piston bore 136 at pressure P2. The inlet port 148 is connected to the upper fluid chamber 152 adjacent to the valve seat 154, which has the tapered seat 158 configured to receive the tapered valve pin 160 on the proximal end of the spring-biased, unitary valve piston 162 positioned within the intermediate fluid chamber 164 within the valve body 146. Accordingly, the fluid from the upper fluid chamber 152 flows through the valve seat 154 and over the valve pin 160 in an under-then-over-flow configuration, and enters the intermediate fluid chamber 152 at a pressure P4, which is less than pressure P3.

The distal end portion 168 of the piston 162 is slidably received in the receptacle 170 formed in the upper end 172 of the plug 174 connected to the body 146. The receptacle 170 is connected to the pilot passageway 150 and receives a portion of the fluid at pressure P2. Accordingly, the fluid at pressure P2 acts against the end of the piston's distal end portion 68, which has the same engagement area as the valve pin 160.

The intermediate chamber portion 164 is connected to the chamber's bottom portion 176, which is connected to the outlet port 180 of the outlet stage 114 through which the flow of fluid substantially at pressure P4 can pass at a constant rate during operation of the first stage 112 and outlet stage 114 when a sufficient pressure drop is provided between the first stage's inlet port 118 and the second stage's outlet port 180.

The outlet stage 114 coupled with the first constant flow rate valve allows the flow control assembly 110 to handle up to a very large pressure differential between the inlet port 118 of the first stage 112 and the outlet port 180 of the outlet stage 114, while avoiding an excessive single pressure drop within the assembly, thereby avoiding potentially destructive cavitation within the assembly. The first stage and the outlet stages 112 and 114 can also be tuned for flow rates up to approximately 2 gpm, with a turndown ratio of up to approximately 3000:1 and for overall pressure drops in the range of approximately 500-5000 psi, and a pressure drop across each individual stage in the range of approximately 500-3000 psi by selecting a suitable size of the valve pin and piston, as well as the biasing springs within the stages.

Figure 5:
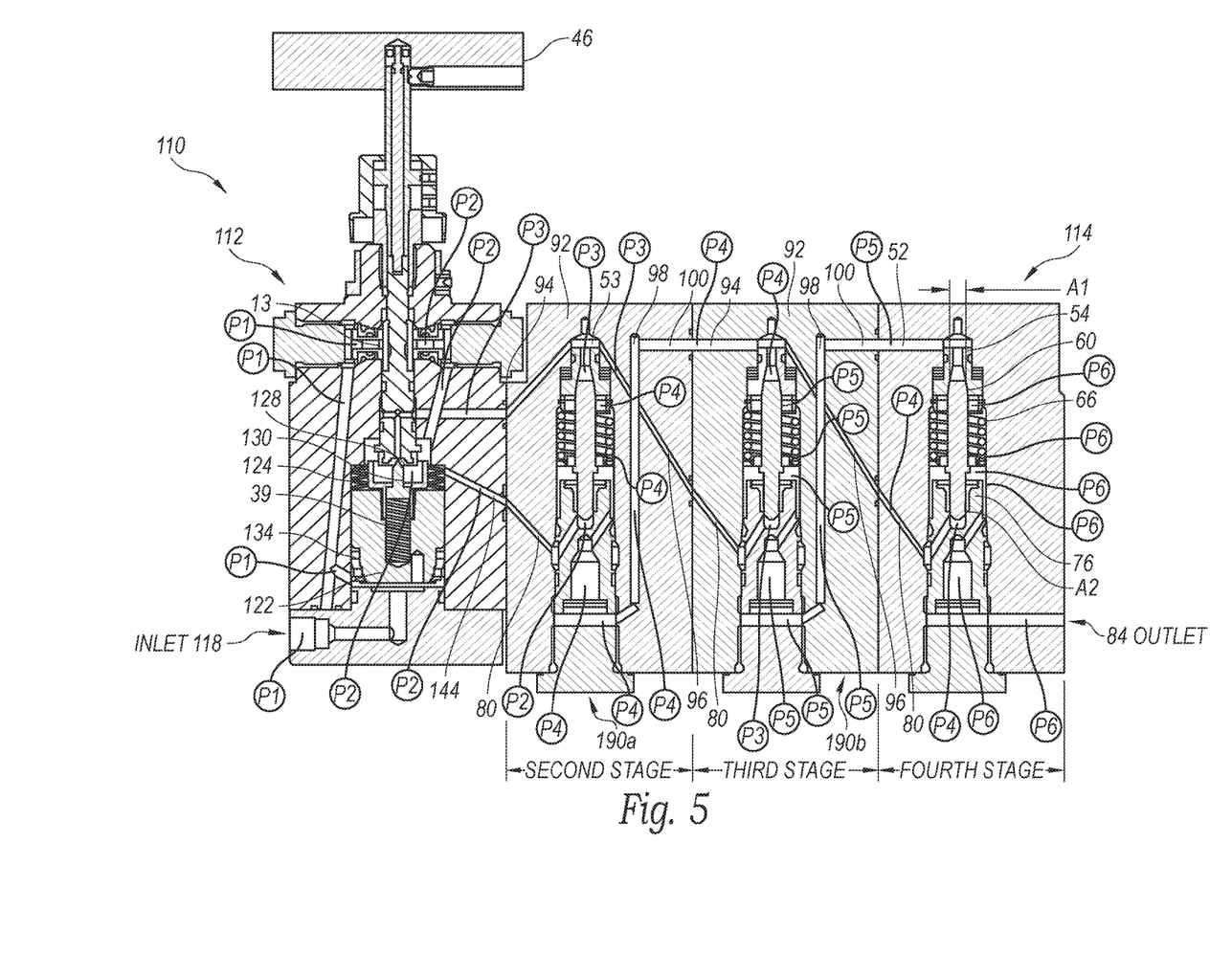
FIG. 5 is a schematic cross-sectional view of the flow control assembly of FIG. 4 in a four stage arrangement with two intermediate stages (i.e., second and third stages connected to the outlet stage (i.e., fourth stage).

FIG. 5 is a schematic cross-sectional view of the flow control assembly 110 of FIG. 4 in a four stage arrangement with the constant flow control valve of the first stage 112 and two intermediate stages 190a and 190b (i.e., second and third stages connected to the outlet stage 114 (i.e., fourth stage)). Each intermediate stage 190a and 190b are substantially identical to the intermediate stages 90a and 90b and are connected to each other as discussed above, so the description thereof need not be repeated. The inlet port 94 of the second stage 190a is sealably connected to the outlet port 120 of the first stage 112, so as to receive the fluid at pressure P3. The pilot passageway 80 of the second stage 190a is sealably connected to the pilot passageway 144 of the first stage 112, so as to receive the fluid at pressure P2. In addition, the outlet port 100 of the third stage 90b is sealably connected to the inlet port 148 of the outlet stage 114, so as to receive the fluid at pressure P5, which is less than P4. The pilot passageway 96 of the third stage 190b is sealably connected to the pilot passageway 150 of the outlet stage 114 so as to receive the fluid at pressure P4. The fluid exiting the outlet port 84 of the outlet stage 114 is at pressure P6, which is less than P5. The intermediate stages 190a and/or 190b and the outlet stage 114 can be tuned to provide for the constant flow rate up to approximately 2 gpm with a turndown ratio of up to approximately 3000:1, and for a ultimate pressure drop across the valve assembly 110 in the range of approximately 500-20,000 psi. Each of the intermediate stages 190a/190b and/or outlet stage 114 can be configured and tuned to allow a pressure drop across each stage in the range of approximately 500-3000 psi. Greater pressure drops can be accommodated by adding additional intermediate stages, while avoiding potential cavitation conditions within any of the stages.

Figure 6:
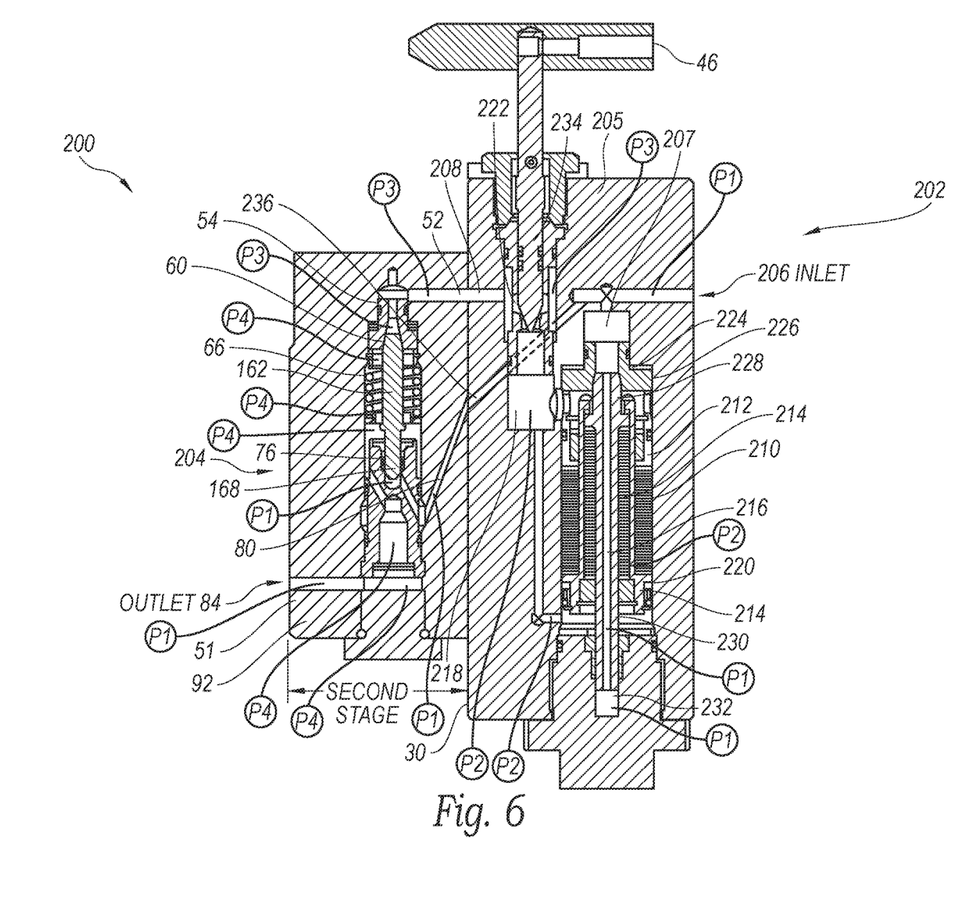
FIG. 6 is a schematic cross-sectional view of a flow control assembly in accordance with another embodiment of the present technology, wherein a high drop rate control valve is coupled to an outlet stage.

FIG. 6 is a schematic cross-sectional view of a flow control assembly 200 in accordance with another embodiment of the present technology, wherein a high drop rate control valve 202 is a first stage coupled to an outlet stage 204. Except as discussed below, the high drop rate control valve 202 can be similar to the control valve as described in U.S. Pat. No. 9,052,715, which is incorporated herein in its entirety by reference thereto. In other embodiments, the first stage of the flow control assembly 200 can be a back pressure regulator, such as the back pressure regulator, as disclosed in U.S. Pat. No. 9,122,282, which is incorporated herein in its entirety by reference. The control valve 202 of the illustrated embodiment is a pressure-independent flow rate controller that has a body 205 with a flow inlet 206 and a flow outlet 208 through which fluid flows, wherein fluid pressure at the flow inlet is an inlet pressure (P1) and the fluid pressure at the flow outlet is an outlet pressure (P3). The inlet 206 is connected to an inlet passageway 207 that directs the fluid into the valve. An interior chamber 210 has first and second chamber portions 212 and 214, respectively, and a balance channel 216 adjacent to the second chamber portion 214. An intermediate passageway 218 interconnects the flow outlet 208 to the first chamber portion 212. A spring-biased piston 220 is slidably disposed in the interior chamber 210. An intermediate space 222 in the chamber is in fluid communication with the flow outlet 208, and the pressure of the fluid in the intermediate space 222 is substantially at the outlet pressure (P3). The size of the piston 220 and the effective areas acted upon by the fluid at the intermediate and outlet pressures (P2 and P3) are such that the piston spring and associated dynamic seals balance the opposing forces in the interior chamber.

A throttling assembly 224 having a throttle seat 226 and a throttling member 228 is positioned between the inlet 206 and the piston 220. The throttling member 228 is connected to the piston 220 and has an end portion shaped to mate with the flow exit of the throttling seat 226. The end portion has a first area acted upon by the fluid flowing through the throttling channel substantially at the inlet pressure (P1) acts. The throttling member 228 is movable relative to the throttling seat 226 to regulate fluid flow through the throttling assembly 224. The throttling member 228 in an open position allows the fluid to flow into the first chamber portion. The fluid flowing through the throttling assembly 224 enters the intermediate passageway 218 at an intermediate pressure (P2), which is less than the inlet pressure (P1) and greater than the outlet pressure (P3).

A balance member 230 is coupled to the piston 220 and is connected to the throttling member 228. In the illustrated embodiment, the balance member 230 and throttling member 228 are integrally connected forming a unitary member. The balance member 230 has a portion sealably extending into the balance channel 232 and has a fluid-acting surface with an area substantially equal to the first area of the end portion of the throttling member 228. The balance channel 232 is in communication with the fluid inlet, and the balance channel contains fluid at the inlet pressure (P1). The fluid pressure in the balance channel 232 acts on the fluid-acting surface to balance the fluid pressure acting on the end portion of the throttling member 228. A restriction assembly 234 is between the intermediate passageway 218 and the flow outlet 208. The restriction assembly 234 is adjustable between closed and open positions. In at least one embodiment, the restriction assembly can be a needle valve assembly or other suitable controllable valve assembly. The restrictor assembly 234 in the open position allows the fluid in the intermediate passageway 218 (at the intermediate pressure (P2)) to flow at a selected constant flow rate into the flow at the outlet pressure (P3), wherein the selected constant flow rate is independent of a pressure differential between the outlet pressure (P3) and the inlet pressure (P1).

The body 205 of the control valve 202 has a pilot passageway 236 connected to the inlet passageway 207 so as to receive a portion of the fluid at pressure P1. The body 205 of the control valve 202 is securely connected to the valve body 51 of the outlet stage 204. The outlet stage 204 is substantially identical to the outlet stage 14 discussed above in connection with FIG. 1. The inlet port 52 of the outlet stage 204 is sealably connected to the outlet 208 of the control valve 202 so as to receive the fluid from the control valve at pressure P3. The pilot passageway 236 in the body 205 of the control valve 202 is sealably connected to the pilot passageway 80 in the body 92 of the outlet stage 204 so as to receive the portion of the fluid at pressure P1 that acts against the distal end 168 of the piston 162 as discussed above. The outlet stage 204 can be tuned to provide the desired pressure drop across the stage to accommodate the overall pressure drop of the valve assembly 10 between P1 and P4 to maintain the desired constant flow without potentially destructive cavitation within the assembly.

In yet another embodiment, one or more intermediate stages 90/190 can be positioned between the control valve 202 and the outlet stage 204 in a manner substantially as described above in connection with FIGS. 2, 3, and 5. Accordingly, the control assembly 200 can be a multi stage assembly with the downstream stages tuned to provide a controllable fluid flow rate over a wide range of pressure drops across the assembly.

In another embodiment, the first stage of the flow control assembly 200 can be a flow controller with a body with a flow inlet and a flow outlet 208 through which fluid flows, wherein fluid pressure at the flow inlet is a fluid pressure P1, and the fluid pressure at the flow outlet is an outlet pressure (P2). An adjustable flow control valve, which may be as simple as a needle valve assembly intermediate the flow inlet and the flow outlet, wherein the fluid pressure across the needle valve assembly drops from P1 to P2. The body of the flow controller has a pilot passageway connected to the inlet passageway so as to receive a portion of the fluid at pressure P1. The flow controller's body is securely connected to the valve body 51 of a second stage, such as an outlet stage substantially identical to the outlet stage 14 discussed above in connection with FIG. 1. Accordingly, the inlet port 52 of the outlet stage's valve body 51 receives the flow of fluid at pressure P2. The bottom of the outlet stage's receptacle 70 is fluidly connected to the second pilot passageway 80, which is connected to the pilot passageway in the body of the flow controller, such that fluid at pressure P1 is provided to the receptacle 70 to engage and act against the bottom of the piston 62.

Similar to the second stage shown in FIGS. 1 and 6, the intermediate fluid chamber 64 is connected to the chamber's bottom portion 75 by a lower channel 82, and the bottom portion 75 is connected to an outlet port 84. The fluid, however, flows from the outlet port 84 substantially at pressure P3 so as to allow for control of the fluid flow with large overall pressure drops across the system, while controlling the pressure drop and flow across the needle valve assembly or other control valve assembly in the first stage to prevent, thereby protecting the valve assembly from damage due to cavitation or the like. In one embodiment, the stiffness of the spring 66 in the second stage can selected to help control the maximum pressure drop across the first stage. If the total pressure drop across the entire system is expected to be sufficiently high, one or more intermediate stages, such as intermediate stages 90a and 90b of FIG. 3, could be used with the first and second stages. Accordingly, the resulting system can handle up to very large pressure drops across the entire system, while still protecting the valve assembly in the first stage from potentially destructive cavitation or turbulent fluid flows that could substantively damage or wear the valve assembly over time.

Throughout this disclosure, the singular terms "a," "an," and "the" include plural referents unless the context clearly indicates otherwise. Similarly, unless the word "and/or" is expressly limited to mean only a single item exclusive from the other items in reference to a list of two or more items, then the use of "and/or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper" and "lower" may be used herein to express and clarify the relationship between various elements. It should be understood that such terms do not denote absolute orientation. Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A multistage flow control assembly configured to accommodate pressure drops across a system while maintaining a desired flow rate, the flow control assembly comprising:
    a first stage comprising:
        a first body having a first inlet port, a first outlet port, and a first fluid passageway therebetween containing fluid at a first fluid pressure, a second fluid pressure, and a third fluid pressure, the second fluid pressure being less than the first fluid pressure, and the third fluid pressure being less than the second fluid pressure;
        a bore having lower and upper portions, the lower portion being in fluid communication with the first inlet port and in fluid communication with the upper portion via an orifice flow path;
        a biased first piston slidably positioned within the bore and coupled to the first fluid passageway;
        a first fluid control portion configured to receive fluid at the second fluid pressure and direct fluid toward the first outlet port at the third fluid pressure, the first fluid control portion being automatically adjusted in response to the second and/or third fluid pressures; and
        a pilot passageway in fluid communication with the upper portion of the bore and configured to receive fluid at the second fluid pressure; and
    a second stage in fluid communication with the first stage and comprising:
        a second body coupled to the first body of the first stage and having a second inlet port in fluid communication with the first outlet port, a second outlet port, and a second fluid passageway between the second inlet and outlet ports, the second fluid passageway containing the fluid at the second and third fluid pressures and a fourth fluid pressure less than the third fluid pressure;
        a receptacle attached to and in fluid communication with the pilot passageway, wherein the receptacle is configured to receive a portion of fluid at the second fluid pressure;
        a biased second piston in the second body and having a proximal end portion and a distal end portion opposite the proximal end portion, wherein the distal end portion is in fluid communication with the portion of the fluid at the second fluid pressure, and the proximal end portion is in fluid communication with the fluid at the third fluid pressure, and wherein the second piston is axially moveable in the second body in response to the second and/or third fluid pressures; and
        a second fluid control portion configured to receive fluid at the third fluid pressure and direct fluid toward the second outlet port at the fourth fluid pressure, wherein the second fluid control portion is automatically adjusted to control flow therethrough in response to the second, third and/or fourth fluid pressures;
        wherein the second piston includes a valve portion at the proximal end portion, and the second fluid control portion includes a valve seat member, wherein fluid flows through the valve seat member past the valve portion and undergoes a pressure drop from the third fluid pressure to the fourth fluid pressure, and wherein positioning of the valve portion relative to the valve seat member is automatically adjusted in response to the second, third and/or fourth fluid pressures.

2. The flow control assembly of claim 1 wherein the fluid that flows through the valve portion flows along a fluid path flowing under the valve seat member and then over the valve portion.

3. The flow control assembly of claim 1 wherein the valve portion and valve seat member are tapered in a mating configuration.

4. The flow control assembly of claim 1, further comprising a biasing member configured to urge the valve portion away from the valve seat member such that an increase in fluid pressure experienced in the first and/or second fluid passageways urges the second valve portion away from the second valve seat.

5. The flow control assembly of claim 1 wherein the first fluid control portion comprises a biased second valve and a second valve seat, wherein fluid flows through the second valve and second valve seat and undergoes a pressure drop from the second fluid pressure to the third fluid pressure, and wherein positioning of the second valve relative to the second valve seat is automatically adjusted in response to the second and/or third fluid pressures.

6. The flow control assembly of claim 1 wherein the pilot passageway is a first pilot passageway attached to the first body, the second stage further comprising a second pilot passageway attached to the second body and configured to receive fluid at the second fluid pressure, the first pilot passageway being in fluid communication with the receptacle via the second pilot passageway.

7. The flow control assembly of claim 1 wherein the first fluid control portion is a variable restrictor assembly positioned between a first flow passageway containing the fluid at the first fluid pressure and a second flow passageway containing the fluid at the second fluid pressure, the variable restrictor assembly being configured to receive fluid from the first flow passageway and to direct the received fluid to the second flow passageway, the first flow passageway being in fluid communication with the inlet port, and the second flow passageway being in fluid communication with the upper portion of the bore.

8. The flow control assembly of claim 7 wherein the receptacle is a first receptacle, the pilot passageway is a first pilot passageway, and the second body has a second pilot passageway in fluid communication with the second inlet port and configured to receive fluid at the third fluid pressure, the flow control assembly further comprising a third stage that comprises:
 a third body coupled to the second body of the second stage and having a third inlet port in fluid communication with the second outlet port, a third outlet port, and a third fluid passageway between the third inlet and outlet ports, the third fluid passageway containing the fluid at the third and fourth fluid pressures and a fifth fluid pressure less than the fourth fluid pressure;
 a second receptacle in fluid communication with the second pilot passageway and configured to receive a portion of the fluid at the third fluid pressure;
 a biased third piston in the third body and having a proximal end portion and a distal end portion opposite the proximal end portion, wherein the distal end portion of the third piston is in fluid communication with the portion of the fluid at the third fluid pressure, and the proximal end portion is in fluid communication with the fluid at the fourth fluid pressure, and wherein the third piston is axially moveable in the third body in response to the third and/or fourth fluid pressures; and
 a third fluid control portion configured to receive fluid at the fourth fluid pressure and direct fluid toward the third outlet port at the fifth fluid pressure, wherein the third fluid control portion is automatically adjusted to control flow therethrough in response to the third, fourth and/or fifth fluid pressures.

9. The flow control assembly of claim 1 wherein the receptacle is adjacent the distal end portion of the second piston and is configured to receive the distal end portion of the second piston.

10. A multistage flow control assembly configured to accommodate pressure drops across a system while maintaining a desired flow rate, the flow control assembly comprising:
 a first stage comprising:
  a first body having a first inlet port, a first outlet port, and a first fluid passageway therebetween containing fluid at a first fluid pressure, a second fluid pressure, and a third fluid pressure, the second fluid pressure being less than the first fluid pressure, and the third fluid pressure being less than the second fluid pressure;
  a bore having lower and upper portions, the lower portion being in fluid communication with the first inlet port and in fluid communication with the upper portion via an orifice flow path;
  a biased first piston slidably positioned within the bore and coupled to the first fluid passageway;
  a first fluid control portion configured to receive fluid at the second fluid pressure and direct fluid toward the first outlet port at the third fluid pressure, the first fluid control portion being automatically adjusted in response to the second and/or third fluid pressures; and
  a first pilot passageway in fluid communication with the upper portion of the bore and configured to receive fluid at the second fluid pressure; and
 a second stage in fluid communication with the first stage and comprisinq:
  a second body coupled to the first body of the first stage and having a second inlet port in fluid communication with the first outlet port, a second outlet port, and a second fluid passageway between the second inlet and outlet ports, the second fluid passageway containing the fluid at the second and third fluid pressures and a fourth fluid pressure less than the third fluid pressure;
  a receptacle attached to and in fluid communication with the first pilot passageway, wherein the receptacle is configured to receive a portion of fluid at the second fluid pressure;
  a biased second piston in the second body and having a proximal end portion and a distal end portion opposite the proximal end portion, wherein the distal end portion is in fluid communication with the portion of the fluid at the second fluid pressure, and the proximal end portion is in fluid communication with the fluid at the third fluid pressure, and wherein the second piston is axially moveable in the second body in response to the second and/or third fluid pressures;
  a second fluid control portion configured to receive fluid at the third fluid pressure and direct fluid toward the second outlet port at the fourth fluid pressure, wherein the second fluid control portion is automatically adjusted to control flow therethrough in response to the second, third and/or fourth fluid pressures; and
  a second pilot passageway in fluid communication with the second inlet port and configured to receive fluid at the third fluid pressure;

a third stage comprising:
  a third body coupled to the second body of the second stage and having a third inlet port in fluid communication with the second outlet port, a third outlet port, and a third fluid passageway between the third inlet and outlet ports, the third fluid passageway containing the fluid at the third and fourth fluid pressures and a fifth fluid pressure less than the fourth fluid pressure;
  a second receptacle in fluid communication with the second pilot passageway and configured to receive a portion of the fluid at the third fluid pressure;
  a biased third piston in the third body and having a proximal end portion and a distal end portion opposite the proximal end portion, wherein the distal end portion of the third piston is in fluid communication with the portion of the fluid at the third fluid pressure, and the proximal end portion is in fluid communication with the fluid at the fourth fluid pressure, and wherein the third piston is axially moveable in the third body in response to the third and/or fourth fluid pressures; and
  a third fluid control portion configured to receive the fluid at the fourth fluid pressure and direct the fluid toward the third outlet port at the fifth fluid pressure, and wherein positioning of the third fluid portion is automatically adjusted to control flow therethrough in response to the third, fourth and/or fifth fluid pressures.

11. The flow control assembly of claim 1 wherein the second stage is removably connectable to the first stage.

12. The flow control assembly of claim 1 wherein the flow control assembly is at least one of a flow control valve or a back pressure regulator.

13. A constant-flow multistage valve assembly, comprising:
  a first fluid passageway configured to carry fluid at a first fluid pressure;
  a second fluid passageway configured to carry fluid at a second fluid pressure less than the first fluid pressure;
  a third fluid passageway configured to carry fluid at a third fluid pressure less than the second fluid pressure;
  a fourth fluid passageway configured to carry fluid at a fourth fluid pressure less than the third fluid pressure;
  a flow orifice in fluid communication with the first fluid passageway and configured to direct fluid from the first fluid passageway at the first fluid pressure to the second fluid passageway at the second fluid pressure;
  a bore having lower and upper portions in fluid communication with one another via the flow orifice, the lower portion being in fluid communication with the first fluid passageway at the first fluid pressure, and the upper portion being in fluid communication with the second fluid passageway at the second fluid pressure;
  a biased first piston slidably positioned within the bore and coupled to the first fluid passageway at the first fluid pressure and/or the second fluid passageway at the second fluid pressure;
  a first fluid control portion configured to direct fluid from the second fluid passageway at the second fluid pressure through the first fluid control portion to the third fluid passageway at the third fluid pressure, the first fluid control portion being automatically adjusted in response to the second and/or third fluid pressures;
  a pilot passageway in fluid communication with the upper portion of the bore and the second fluid passageway;
  a channel fluidly coupled to the third fluid passageway and configured to receive fluid from the first fluid control portion at the third fluid pressure;
  a receptacle in fluid communication with the pilot passageway, wherein the receptacle is configured to receive a portion of fluid at the second fluid pressure;
  a biased second piston fluidly coupled to the fourth fluid passageway, the second piston having a proximal end portion and a distal end portion opposite the proximal end portion, wherein the distal end portion is in fluid communication with the portion of the fluid at the second fluid pressure, and the proximal end portion is in fluid communication with the third fluid passageway at the third fluid pressure, and wherein the second piston is axially moveable in response to the second and/or third fluid pressures; and
  a second fluid control portion configured to receive fluid from the third fluid passageway at the third fluid pressure and direct fluid through the second fluid control portion to the fourth fluid passageway at the fourth fluid pressure, the second fluid control portion being automatically adjusted to control flow therethrough in response to the second, third and/or fourth fluid pressures.

14. The valve assembly of claim 13 wherein the second piston includes a valve portion at the proximal end portion, and wherein the second fluid portion includes a valve seat member, wherein fluid flows through the valve seat member past the valve portion and undergoes a pressure drop from the third fluid pressure to the fourth fluid pressure, and wherein positioning of the valve portion relative to the valve seat member is automatically adjusted in response to the second, third and/or fourth fluid pressures.

15. The valve assembly of claim 14 wherein the fluid that flows through the second valve seat member flows along a fluid path flowing under the second valve seat member and then over the second valve portion.

16. The valve assembly of claim 14 wherein the second valve portion and second valve seat member are tapered in a mating configuration.

17. The valve assembly of claim 14, further comprising a biasing member configured to urge the valve portion away from the valve seat member such that an increase in fluid pressure experienced in the first, second, third and/or fourth fluid passageways urges the valve portion away from the valve seat member.

18. The valve assembly of claim 14, wherein the first fluid control portion includes a biased first valve and a first valve seat, wherein fluid flows through the first valve and first valve seat and undergoes a pressure drop from the second fluid pressure to the third fluid pressure, and wherein positioning of the first valve relative to the first valve seat is automatically adjusted in response to the first, second and/or third fluid pressures.

19. The valve assembly of claim 13 wherein the pilot passageway is a first pilot passageway, the valve assembly further comprising a second pilot passageway attached to the receptacle and configured to receive fluid at the second fluid pressure, the first pilot passageway being in fluid communication with the receptacle via the second pilot passageway.

20. The valve assembly of claim 13 wherein the first fluid control portion is a variable restrictor assembly positioned between a first flow passageway containing the fluid at the first fluid pressure and a second flow passageway containing the fluid at the second fluid pressure, wherein the fluid flows through the variable restrictor assembly and undergoes a pressure drop from the first fluid pressure to the second fluid pressure, the first flow passageway being in fluid communication with the first fluid passageway, and the second flow passageway being in fluid communication with the second fluid passageway.

21. The flow control assembly of claim 20 wherein the receptacle is a first receptacle and the pilot passageway is a first pilot passageway, the flow control assembly further comprising:
a second pilot passageway in fluid communication with the third fluid passageway at the third fluid pressure;
a fifth fluid passageway configured to carry fluid at a fifth fluid pressure less than the fourth fluid pressure;
a second receptacle in fluid communication with the second pilot passageway and configured to receive a portion of the fluid at the third fluid pressure;
a biased third piston fluidly coupled to the fifth fluid passageway, the third piston having a proximal end portion and a distal end portion opposite the proximal end portion, wherein the distal end portion of the third piston is in fluid communication with the portion of the fluid at the third fluid pressure, and the proximal end portion of the third piston is in fluid communication with the fluid at the fourth fluid pressure, and wherein the third piston is axially moveable in response to the third and/or fourth fluid pressures; and
a biased third fluid control portion configured to receive fluid at the fourth fluid pressure and direct fluid toward the fifth fluid passageway at the fifth fluid pressure, wherein positioning of the third fluid portion is automatically adjusted to control flow therethrough in response to the third, fourth and/or fifth fluid pressures.

22. The valve assembly of claim 13 wherein the receptacle is a first receptacle and the pilot passageway is a first pilot passageway, the flow control assembly further comprising:
a second pilot passageway in fluid communication with the third fluid passageway at the third fluid pressure;
a fifth fluid passageway configured to carry fluid at a fifth fluid pressure less than the fourth fluid pressure;
a second receptacle in fluid communication with the second pilot passageway and configured to receive a portion of the fluid at the third fluid pressure;
a biased third piston fluidly coupled to the fifth fluid passageway, the third piston having a proximal end portion and a distal end portion opposite the proximal end portion, wherein the distal end portion of the third piston is in fluid communication with the portion of the fluid at the third fluid pressure, and the proximal end portion of the third piston is in fluid communication with the fluid at the fourth fluid pressure, and wherein the second piston is axially moveable in response to the third and/or fourth fluid pressures; and
a biased third fluid control portion configured to receive fluid at the fourth fluid pressure and direct fluid toward the fifth fluid passageway at the fifth fluid pressure, wherein positioning of the third fluid portion is automatically adjusted to control flow therethrough in response to the third, fourth and/or fifth fluid pressures.

23. A flow rate controller, comprising:
a first stage comprising:
a first body having a first inlet port, a first outlet port, and a first fluid passageway therebetween containing fluid at a first fluid pressure, a second fluid pressure, and a third fluid pressure, the second fluid pressure being less than the first fluid pressure, and the third fluid pressure being less than the second fluid pressure;
an interior chamber with first and second chamber portions, and a balance channel adjacent to the second chamber portion, the balance channel being in fluid communication with the first inlet port at the first fluid pressure;
an intermediate passageway at the second fluid pressure and in fluid communication with the first chamber portion;
a first piston slidably disposed in the interior chamber and coupled to the first fluid passageway;
a throttling assembly positioned between the first inlet port and first piston, the throttling assembly being configured to receive fluid at the first fluid pressure and direct fluid through the throttling assembly to the first chamber portion at the second fluid pressure, the throttling assembly being adjustable in response to the first and/or second fluid pressures;
a restriction assembly between the intermediate passageway containing fluid at the second fluid pressure and the first outlet port at the third fluid pressure, the restriction assembly being adjustable between closed and open positions, wherein the open position allows the fluid in the intermediate passageway to flow toward the first outlet port; and
a pilot passageway in fluid communication with the first inlet port and configured to receive fluid at the first fluid pressure; and
a second stage in fluid communication with the first stage and comprising:
a second body coupled to the first body of the first stage and having a second inlet port in fluid communication with the first outlet port, a second outlet port, and a second fluid passageway between the second inlet and outlet ports, the second fluid passageway containing the fluid at the first and third fluid pressures and a fourth fluid pressure less than the third fluid pressure;
a receptacle attached to and in fluid communication with the pilot passageway, wherein the receptacle is configured to receive a portion of the fluid at the first fluid pressure;
a biased second piston in the second body and having a proximal end portion and a distal end portion opposite the proximal end portion, wherein the distal end portion is in fluid communication with the portion of the fluid at the first fluid pressure, and the proximal end portion is in fluid communication with the fluid at the third fluid pressure, and wherein the second piston is axially moveable in the second body in response to the first and/or third fluid pressures; and
a valve seat member configured to receive a valve portion at the proximal end portion, wherein the fluid flows between the valve seat member and valve portion and undergoes a pressure drop from the third fluid pressure to the fourth fluid pressure, and wherein positioning of the valve portion relative to the valve seat member is automatically adjusted in response to the first, third and/or fourth fluid pressures.

24. The flow rate controller of claim 23 wherein the valve portion and valve seat member are tapered in a mating configuration, the flow rate controller further comprising a biasing member configured to urge the valve portion away from the valve seat member such that an increase in fluid pressure experienced in the first and/or second fluid passageways urges the valve portion away from the valve seat member.

25. A constant-flow multistage valve assembly, comprising:
- a first fluid passageway configured to carry fluid at a first fluid pressure;
- a second fluid passageway configured to carry fluid at a second fluid pressure less than the first fluid pressure;
- a third fluid passageway configured to carry fluid at a third fluid pressure less than the second fluid pressure;
- a fourth fluid passageway configured to carry fluid at a fourth fluid pressure less than the third fluid pressure;
- a flow orifice in fluid communication with the first fluid passageway and configured to direct fluid from the first fluid passageway at the first fluid pressure to the second fluid passageway at the second fluid pressure;
- a first fluid control portion configured to direct fluid from the second fluid passageway at the second fluid pressure through the first fluid control portion to the third fluid passageway at the third fluid pressure, the first fluid control portion being adjustable in response to the second and/or third fluid pressures;
- a pilot passageway in fluid communication with the second fluid passageway;
- a channel fluidly coupled to the third fluid passageway and configured to receive fluid from the first fluid control portion at the third fluid pressure;
- a biased piston fluidly coupled to the fourth fluid passageway, the piston having a proximal end portion and a distal end portion opposite the proximal end portion, wherein the distal end portion is in fluid communication with the portion of the fluid at the second fluid pressure, and the proximal end portion is in fluid communication with the third fluid passageway at the third fluid pressure, and wherein the piston is axially moveable in response to the second and/or third fluid pressures;
- a second fluid control portion configured to receive fluid from the third fluid passageway at the third fluid pressure and direct fluid through the second fluid control portion to the fourth fluid passageway at the fourth fluid pressure, the second fluid control portion being automatically adjusted to control flow therethrough in response to the second, third and/or fourth fluid pressures; and
- a receptacle in fluid communication with the pilot passageway, wherein the receptacle is configured to receive a portion of fluid at the second fluid pressure that acts against the distal end of the piston.

* * * * *